United States Patent Office 3,350,304
Patented Oct. 31, 1967

3,350,304
WATER TREATMENT COMPOSITIONS
AND PROCESSES
Oliver M. Bacon, Arvada, Colo., assignor to The Hunnewell Soap Company, Cincinnati, Ohio, a corporation of Ohio
No Drawing. Filed Feb. 18, 1965, Ser. No. 433,790
8 Claims. (Cl. 210—52)

This invention relates to a new and useful coagulant composition for flocculating finely divided solids suspended in water or aqueous solutions. More particularly, it relates to such a coagulant, a method for preparing it and its use in the treatment or clarification of water, especially raw or natural waters intended for human consumption.

The present coagulant compositions and processes are improvements or supplements for those of my copending application Ser. No. 420,113, filed Dec. 21, 1964, and are especially useful in adapting the compositions described in my prior application for more efficient use in treating waters of comparatively low hardness and turbidities.

In accordance with the present invention there is provided a composition to be employed in the treatment of water comprising a non-expanding clay, a sulfate of a polyvalent metal and a natural gum. Such product is preferably made by blending the sulfate and gum into a larger mass of warm dry clay, whereby the gum causes the clay to adhere thereto and produces free flowing small particles of the composition. In a preferred embodiment of the invention, a composition of the above type is utilized with or mixed into a water treatment composition of the type described in my aforementioned application, Ser. No. 420,113. Thus, such combined compositions will include pyrophyllite, acidified, preferably with sulfuric acid, and subsequently neutralized, preferably with sodium carbonate, together with sodium aluminate and the heretofore mentioned clay, metal salt coagulant and polyelectrolyte. Preferably, phosphate rock is present with the pyrophyllite and is acidulated and neutralized to an alkaline pH, together with the pyrophyllite.

In use, the compositions may be employed sequentially or the mixture thereof may be used to treat the water. In such treatments, other chemicals such as alum and lime may be utilized and other effects, in addition to clarification, will desirably be obtained. For example, the water may be made potable, hardness may be diminished and pH may be controlled, as desired.

These compositions and methods are especially useful in treating waters of low hardness and low turbidity. Such waters, especially if treated with large amounts of lime, such as those which might otherwise be desirably employed together with activated pyrophyllite and sodium aluminate can be detrimentally affected and could be so increased in hardness as to make them unsuitable for desired final uses. Then, too, the increased alkalinity in the product water which would result may sometimes be objectionable. Thus, post-treatments of such waters to decrease alkalinity and remove added hardness may be avoided by the present ivention.

The compositions and processes of this invention have been found to be useful in efficiently treating a variety of waters passing through municipal water treatment plants. Although such runs were experimental, they were made at operating water treatment facilities, rather than in the laboratory. The advantages of the invention will be additionally apparent from the specification and the examples given herein.

Among the non-expanding clays useful in the present invention there may be named kaolin, ball clays, china clay, and fire clay. Although the usual clays employed usually will have an alumina content of from about 6 to 8 percent, clays containing more alumina may also be employed. Thus, it may be desirable to use clays containing from 4 to 30 percent alumina. The particle size of the clay is preferably held within the range of about 125 to 200 mesh, U.S. Standard Sieve Series (1940), although in some applications it may be desirable to use particles having a size in the range of 100 to 250 mesh, i.e., 0.0059 to 0.0029 inch average diameter. In addition to the particle size of the clay, also to be noted is that the clays employed should be such as to have a lower proportion of colloidal particles than bentonite. It has been found that bentonites, especially the expandable or swellable bentonites, have a deleterious effect on water treatment operations, sometimes resulting in an undesirable carry-over of colloidal material into the filter bed, which shortens the filter run and may cause plugging of the filter bed and shortening of the life thereof. The clays employed are desirably free of pigmentation, it having been found that when pigments are present, they may adversely affect the color and quality of the water unless removed by special treatments.

The metal salts employed are usually sulfates of cations of valences of 2 to 3, e.g., ferric sulfate, manganese sulfate, aluminum sulfate, magnesium sulfate. Lithium sulfate may also be used, since it appears to behave much in the manner of a divalent salt. The sulfates have been found to be compatible with the other constituents of the compositions, especially with the products resulting from the acidic treatment of pyrophyllite, as by sulfuric acid. In this respect, other anions, such as chlorides, nitrates and fluorides have been found to be unacceptable in certain waters and are desirably excluded therefrom.

With the non-expanding clay and the sulfate there is employed a material which increases the coalescence of a sodium silicoaluminate aqueous gel so as to enable it quickly to form a floc which entraps suspended materials and speedily causes them to settle out from aqueous media. It has been found that such coalescence regulators, activators or catalysts, include various organic gums such as the natural gums, e.g., carageenin, gum tragacanth, agar agar, alginates, guar gum, locust bean gum and starches. The synthetic gums are not as satisfactory as the natural gums because they are not as biologically digestible as the natural gums. They include sodium carboxymethyl cellulose, polyacrylamides, ethyl celluloses, and polyvinyl alcohols. Among the materials that have been found not harmful and which are said to be suitable for treating water without adverse effects on the users thereof are Floc Aids 1038 and 1063 (National Starch and Chemical Corporation, Plainfield, N.J.); Claron and Claron 207 (Allyl Chemical Company, Cleveland, Ohio); Magnifloc 990 (American Cyanamide Company, New York, N.Y.); Burtonite 78 (The Burtonite Company, Nutley, N.J.); Saperan NP10 Potable Water Grade, a nonionic water-soluble polymer of acrylamide, and Purifloc N17 (Dow Chemical Company, Midland, Mich.); Alchem Coa gu-Aids 252 and 265 and Drewfloc and Drewfloc 256 (Drew Chemical Corporation, Alchem, Inc., Division, New York, N.Y.); Ecco Suspension Catalyzer 146 (Electric Chemical Company, Cleveland, Ohio); Hagan Coagulant Aids Nos. 2, 7, 11, 18, 801 and 952 (Hagan Chemicals and Controls, Inc., Pittsburgh, Pa.); Carboxymethylcellulose (Hercules Powder Company, Wilmington, Del.); Digestible Vegetable Gum, food grade (Meer Chemical Corporation, New York, N.Y.); Illco IFA 313 (Illinois Water Treatment Company, Rockford, Ill.); Ionac Wisprofloc 20 and 75 (Ionac Chemical Company), Birmingham, N.J.); Kelgin W and Kelcosol sodium alginates (Kelco Company, San Diego, Calif.); Metalene Coagulant P-6 (Metalene Chemical Company, Bedford, Ohio); Nalcolyte 110 (Nalco Chemical Company, Chicago, Ill.); O'B-Floc (O'Brien Industries, Inc., Livingston, N.J.); and Jaguar (Stein, Hall & Company, Inc., New York, N.Y.). The natural gum to be employed may be selected from this list.

The described gums act somewhat like polyelectrolytes and facilitate the formation of a desired floc that is large in size and of sufficient density so that it will settle rapidly, leasing no evidence of colloidal suspension and therefore will often result in a water of zero turbidity, clear and bright. The gums, of vegetable origin, avoid the disadvantages of polyelectrolytes because they are completely digestible and do not combine with undesirable and even possibly harmful industrial waste which might be present in the water to be treated. Polyelectrolytes are employable in the absence of such wastes and in such circumstances may be used with the vegetable gums previously mentioned.

The gums employed in this invention intensify the electronic charge of the invented composition, particularly the clay therein. This intensive electronic charge is developed by contact prior to dispersion of the invented product in the water to be treated. The "supercharged" compositions of this invention are more effective in forming floc and removing the turbidity of the water.

In addition to the materials mentioned above, also employable with the described water treating composition is sodium aluminate. Sodium aluminate is used in the composition of my parent application but may also be included with the clay, salt and digestible gum.

The pyrophyllite employed is an aluminum silicate of a physical structure comprising a plurality of layers or leaves, which, when treated with sulfuric acid, decomposes and forms silica gel and aluminum sulfate. Pyrophyllite usually has a silica content of about 50 to 80 percent by weight and a preferred pyrophyllite comprises from 60 to 70 percent silica.

When compounded separately, the combination of non-expanding clay, metal sulfate and digestible gum is preferably made of 30 to 95 percent of clay, 3 to 30 percent of sulfate and 0.5 to 15 percent of the gum. When sodium aluminate is present in these compositions the proportion thereof, may be from 5 to 25 percent. Preferred ranges are 80 to 90 percent clay, 8 to 12 percent sulfate and 1 to 3 percent gum, with 8 to 12 percent sodium aluminate optionally present.

To make the clay-sulfate-gum composition, the constituents may be dry-blended, with each being in finely divided form before blending. Desirably, the particle sizes of the materials will be in the range of 100 to 250 mesh, U.S. Standard Sieve Series. They should be dry, especially when the product is to be blended with the water treatment composition of my application, Ser. No. 420,113. Preferably, the clay is heated to a temperature from about 35 to 95 degrees centigrade and the gum is admixed therewith, so as to finely disperse it in the clay, by which it is warmed and tackified, so that it adheres to the clay and each particle of gum is covered with a layer of dry clay. The composition resulting is free-flowing, which is important in enabling it to be dispersed in the water to be treated without lumping. Also, the clay is in intimate contact with the gum, so as to be activated by it. The sulfate and aluminate, when employed, are preferably pre-mixed with the clay after heating of the clay and before addition of the gum, but may be suitably formulated by additions in other orders. The product resulting from the above method of manufacture is free-flowing, of particle size within the range of 40 to 200 mesh, and includes many nuclei of gum surrounded by adhering particles of clay. It is quickly dispersible in water to be treated.

The above-described composition may be utilized in conjunction with my pyrophyllite-based water treatment compositions, described in my application, Ser. No. 420,113. They may be admixed with such compositions or may be employed as separate treatment agents for water. Such pyrophyllite compositions comprise from about 20 to 100 parts pyrophyllite, 25 to 100 parts sulfuric acid, 10 to 100 parts sodium carbonate or equivalent alkali, the amount of such alkali employed being such as to raise the pH of the other named materials to from 7.5 to 10.5, 9.5 being preferred, and 100 to 250 parts of sodium aluminate. It has been found to be especially helpful in increasing the effectiveness of the treating compositions to have a proportion of the pyrophyllite, from about 20 to 70 percent of that otherwise present, replaced by phosphate rock of similar particle size. Usually from .5 to 2 parts of phosphate rock will be present for each part of pyrophyllite and a preferred ratio is 1:1. Parts given by weight. The phosphate rock used may be calcined or uncalcined. It is essentially a calcium phosphate, such as is mined in the Bartow and Mulberry areas of Florida, as examples thereof. Other forms of phosphate rock may also be used, providing that the phosphate is of essentially the same nature as those described above. Also with respect to equivalent materials that may be used, other aluminates, such as potassium and cesium aluminates are useful, although not considered as satisfactory as the sodium aluminate for the purposes of this invention. Other alkali metal carbonates, bicarbonates, such as potassium carbonate and sodium and potassium may be employed as the neutralizing agent, in place of sodium carbonate. Although alkali metal hydroxides are also effective neutralizing agents, they tend to cause more violent reactions and, therefore, are usually avoided.

In making the pyrophyllite compositions, 20 to 100 parts by weight of pyrophyllite or a described mixture of pyrophyllite and phosphate rock is mixed with a suitable proportion of water, such as 25 to 100 parts, after which it is treated with an amount of sulfuric acid, from 25 to 100 parts, sufficient to acidulate the pyrophyllite and phosphate rock, if present. The acidulated rock is then neutralized to a pH of 7.5 to 10.5 with a suitable amount, from 10 to 100 parts of carbonate. The heats of the exothermic reactions involved in these steps aid in driving off the moisture present and the product resulting is a dry powder. Of course, it is desirable to maintain good mixing for all the reactions and additions mentioned, to facilitate the production of a lump-free product. When insufficient heat is generated by the reactions, an external source of heat may be used to dry the pyrophyllite product made. Drying of this product allows it to be compounded or admixed with the aluminate powder, without premature or adverse reaction therewith.

When used with the pyrophyllite composition, my clay-sulfate-gum product is employed to the extent of 20 to 70 percent of the composition made, preferably 40 to 60 percent, the balance being substantially the pyrophyllite composition. Instead of making a combination of the products, they may be employed separately or in sequential treatments, in the same proportions. When compounded together, both materials should be dry, to promote free flowing and to inhibit premature reaction. Alternatively, the materials may be mixed together in an aqueous medium shortly before use, but even when such use is to take place immediately, it is better for the mixture to occur in the water to be treated or in a portion of that water. Mixing of the dry powders and making of the solutions and suspensions may be effected in accord with usual practices, prevailing in the art.

In use, a water of comparatively low hardness and low turbidity, such as an Eastern United States Coast city drinking water, especially for the Northeastern and Middle Atlantic State cities, such as Philadelphia, New York and Boston, usually having a hardness below about 100 parts per million (hereafter designated p.p.m.) of calcium carbonate, is treated with alum and lime, usually in proportions of 5 to 20 p.p.m. alum, 20 to 100 p.p.m. lime, and 2 to 10 p.p.m. of a described combined pyrophyllite-clay-sulfate-gum product of this invention (or same amount of the pyrophyllite composition and the clay-sulfate-gum product separately). Additions of the alum and lime are sequential and the invented composition may be added subsequently to the alum-lime treatment or may be added with either the lime or the alum. These treatment agents are employed in such proportions as to provide material for a hydrated alumina floc to carry down suspended materials, to lime-soften the water and provide sufficient alkalinity to facilitate the formation of the alumina floc in situ. The treatment with the composition of the invention desirably produces from the alumina-lime treated water a finished stable water which is of desirable neutrality, e.g., from a pH of about 7 to 8.5. This is done without increasing the hardness of the water and, of course, the decrease in turbidity is marked. For example, waters treated may have initial hardness of 50 to 120 p.p.m. $CaCO_3$ decreased from 5 to 20 p.p.m. with turbidities of 2 to maximum being decreased to from 0 to 6, when measured on a turbidimeter.

Although the pyrophyllite compositions, without the clay composition treatment, would be useful in the treating of comparatively soft waters, they would not be as desirably effective in such treatments as the pyrophyllite-clay-sulfate-gum treatment. It appears that the digestible natural gums and the sulfates mentioned increase the electronic charge of the clay and act together with the clay to improve the flocculating activity of the silico-aluminate, alumina and silica gels of the pyrophyllite compositions and of the alum employed in water treatment. They do not objectionably increase hardness of the water treated and they produce a stable potable water which is clear and of good taste.

To obtain such results requires no special equipment, treatment temperatures or procedures. Conventional charging means, mixers, settling basins and filters are used in the usual order and arrangement. As to temperatures, the present methods and compositions are operative at usual water treatment temperatures, up to as high as 55 degrees centigrade and are surprisingly effective even as low as 0 degree centigrade.

The following examples illustrate the invention. They are not to be considered as limiting. All parts are by weight and all temperatures are in degrees centigrade unless otherwise indicated.

*Example 1*

To a feed water for a Philadelphia water department treating plant there were added 12.5 parts per million of alum, followed sequentially by 100 parts per million of lime and 5 parts per million of the following composition, designated "Additive A."

ADDITIVE A

| Components: | Parts by weight |
|---|---|
| Activated pyrophyllite-phosphate rock | 245 |
| Sodium aluminate | 180 |
| Kaolin type clay | 374 |
| Ferric sulfate | 42.5 |
| Vegetable gum, digestible (pharmaceutical grade gum guar) | 8.5 |

The activated pyrophyllite-phosphate rock material was made by acidifying a mixture of 75 parts of pyrophyllite and 75 parts of phosphate rock, each of particle size in the range of 40 to 200 mesh, with 75 parts of concentrated sulfuric acid after first adding 50 parts of water to the pyrophyllite-rock mixture. This treatment decreased the pH to about 1.5 and after waiting 5 minutes for the completion of acidulation, 50 parts of soda ash were added, raising the pH to 9.5. The exothermic reaction caused the temperature of the material to be raised to a peak of about 150 degrees centigrade and caused the drying out of the product. To this were added the 180 parts of sodium aluminate, as a dry powder of particle size of approximately 200 mesh.

The kaolin, ferric sulfate and vegetable gum were combined by heating the kaolin to 50 degrees centigrade, mixing the ferric sulfate and the kaolin and then adding the gum to the warmed mixture, with stirring, to tackify the gum and make it adhere to the clay and sulfate. Mixing was continued to produce a particulate product of particle sizes in the range of 40 to 200 mesh, which product was free-flowing and dry.

Before the addition of the alum, lime and Additive A, the water was of a hardness of about 88 p.p.m. as $CaCO_3$, a turbidity of about 10 and a pH of 7.2. After treatment, which was effected by blending into the water the requisite amounts of alum and lime (hydrated) and a dispersion-solution of Additive A in water of a "concentration" of 80 grams/liter until the water contained 5 p.p.m. thereof, the water was of a pH of 6.6, a turbidity of 3.5 and a hardness of 80 p.p.m., calculated as $CaCO_3$. The hardness is calculated as $CaCO_3$ for convenience, although the principal hardness cations in the water are calcium and magnesium. The water was treated in the usual way employed for testing treatment methods, being mixed thoroughly, then allowed to settle for a half hour and then being observed.

The water made was stable and did not contain any clay carry-over which would adversely affect subsequent filtration operations. Similar results are obtained when, instead of the digestible vegetable gum, gum tragacanth, carageenin, guar, agar agar, or suitable starch is employed. Also, in place of the soda ash, an equivalent weight of sodium bicarbonate, potassium carbonate, potassium bicarbonate or other equivalent alkail is used with similar effect. Omission of the phosphate rock still results in a useful operation with comparable results, when pyrophyllite is used in place thereof and the amount of acid and carbonate employed are adjusted to produce a product of the same pH.

*Example 2*

The procedure of Example 1 is followed with the exception that the amount of lime employed in the treating process is 75 parts instead of 50 parts. The water resulting had a pH of 7.9, a turbidity of 5.2 and a hardness, calculated as $CaCO_3$ of 88 p.p.m. When manganese sulfate is used in place of the ferric sulfate, comparable results are obtained. With magnesium sulfate, a good water is obtainable but the treatment is not as effective as with the ferric or manganese salts.

As is seen by the above examples, and as is mentioned herein above, in preferred compositions comprising both the pyrophyllite mixtures and the clay-sulfate-gum product which are combined to form Additive A, the ratios of these two portions may vary from 40:60 to 60:40 in a preferred embodiment. A specific preferred ratio is 50:50 and in such a composition, the ranges of proportions of the individual constituents present will consequently be just one-half those proportions recited earlier in the specification for the pyrophllite and clay-sulfate-gum compositions. Thus, preferred ranges will be from 10 to 50 parts pyrophyllite, 50 to 125 parts alkali metal aluminate, 15 to 48 parts non-expanding clay, 1.5 to 15 parts polyvalent metal sulfate and 0.5 to 1.5 parts digestible natural gum and corresponding proportions of other components.

*Example 3*

The above compositions and processes were compared to a control in which the same city water feed was treated sequentially with 50 parts per million of alum, 50 p.p.m. of lime and no Additive A in an attempt to make a comparable treated water. The water resulting had a pH of 6.5, a hardness of 102 p.p.m. (calculated as $CaCO_3$) and a turbidity of about 8. In addition to being more turbid that that treated by the processes of the present invention it was less stable.

The above examples illustrate some preferred embodiments of the invention. However, the invention is not so limited and is to be considered as being of a breadth commensurate with the claims and reasonable equivalents thereof.

What is claimed is:

1. A composition for treating water comprising from 10 to 50 parts pyrophyllite, 50 to 125 parts alkali metal aluminate, 15 to 48 parts non-expanding clay, 1.5 to 15 parts polyvalent metal sulfate and 0.5 to 1.5 parts digestible natural gum.

2. A composition for treating water comprising 10 to 50 parts of a mixture of acidulated and neutralized pyrophyllite and phosphate rock, of which mixture the phosphate rock is 20 to 70 percent, 50 to 125 parts sodium aluminate, 15 to 48 parts of a non-expanding clay, 1.5 to 15 parts polyvalent metal sulfate and 0.5 to 1.5 parts digestible natural gum.

3. A composition according to claim 2 in which the pyrophyllite and phosphate rock given had been acidulated and neutralized by treatment with from 12.5 to 50 parts of sulfuric acid and from 5 to 50 parts of soda ash.

4. A composition according to claim 2 comprising about 150 parts of a mixture of 75 parts pyrophyllite and 75 parts of phosphate rock, acidulated and neutralized by 75 parts of sulfuric acid and 50 parts of soda ash, 180 parts sodium aluminate, 43 parts ferric sulfate and 9 parts digestible vegetable gum.

5. A method of treating a water of low hardness to clarify it and render it stable and potable, which comprises treating said water with from 5 to 20 p.p.m. alum, 20 to 100 p.p.m. lime and 2 to 10 p.p.m. of a composition comprising 10 to 50 parts pyrophyllite acidulated and neutralized, 50 to 125 parts alkali metal aluminate, 15 to 48 parts non-expanding clay, 1.5 to 15 parts polyvalent metal sulfate and 0.5 to 1.5 parts of organic gum.

6. A method of treating water of low hardness to clarify it, render it stable and potable and maintain the hardness low which comprises treating it in accordance with the process of claim 5, causing the formation of a floc, settling the floc to remove suspended matter and drawing off the clarified water.

7. A method according to claim 6 in which 20 to 70 percent of the pyrophyllite is replaced with phosphate rock, which is acidulated and neutralized.

8. A method of treating water of low hardness which comprises treating it with 5 to 20 p.p.m. alum, 20 to 100 p.p.m. lime, 1 to 5 p.p.m. of a composition comprising 10 to 50 parts of a mixture of pyrophyllite and phosphate rock, acidulated and neutralized and 50 to 125 parts sodium aluminate and 1 to 5 p.p.m. of a composition comprising 15 to 48 parts non-expanding clay, 1.5 to 15 parts ferric sulfate and 0.5 to 1.5 parts of digestible natural gum, settling the floc formed and recovering the clarified, stable potable water of low hardness produced.

References Cited

UNITED STATES PATENTS

| | | | |
|---|---|---|---|
| 2,441,927 | 5/1948 | Adams | 106—308 |
| 2,937,143 | 5/1960 | Goren | 210—54 |
| 3,174,928 | 3/1965 | Keklish | 210—52 X |

FOREIGN PATENTS 434,663   9/1935   Great Britain.

MORRIS O. WOLK, *Primary Examiner.*

MICHAEL E. ROGERS, *Examiner.*